DIAZO-TYPE MULTICOLOR REPRODUCTION PROCESS

Filed July 26, 1971 2 Sheets-Sheet 1

United States Patent Office 3,824,101
Patented July 16, 1974

3,824,101

DIAZO-TYPE MULTICOLAR REPRODUCTION PROCESS

Kouzi Nihyakumen, Hirakata, Taizo Yokoyama, Osaka, Yasutoki Kamezawa, Hirakata, and Tatsuo Aizawa, Osaka, Japan, assignors to Mita Industrial Company, Limited, Osaka, Japan Filed July 26, 1971, Ser. No. 166,061
Claims priority, application Japan, July 28, 1970, 45/65,393
Int. Cl. G03c *5/18, 1/58*
U.S. Cl. 96—49 10 Claims

ABSTRACT OF THE DISCLOSURE

A process for the diazo-type multicolor reproduction which comprises conducting the steps of (A) exposing to light a diazo-type photosensitive material containing at least one diazonium salt through a transparent or semi-transparent original on predetermined portions of the back surface of which is applied at least one layer containing a thermovolatile or thermosublimative dyestuff or pigment and (B) heating the assembly of the original and the photosensitive material in a manner such that the treated back surface of the original will be in a face-to-face contact with the photosensitive layer of the photosensitive material, the steps (A) and (B) being carried out coincidentally or in an order of (A) to (B) or (B) to (A), and then developing the exposed photosensitive material in the presence of a coupler.

Figures 1, 2:
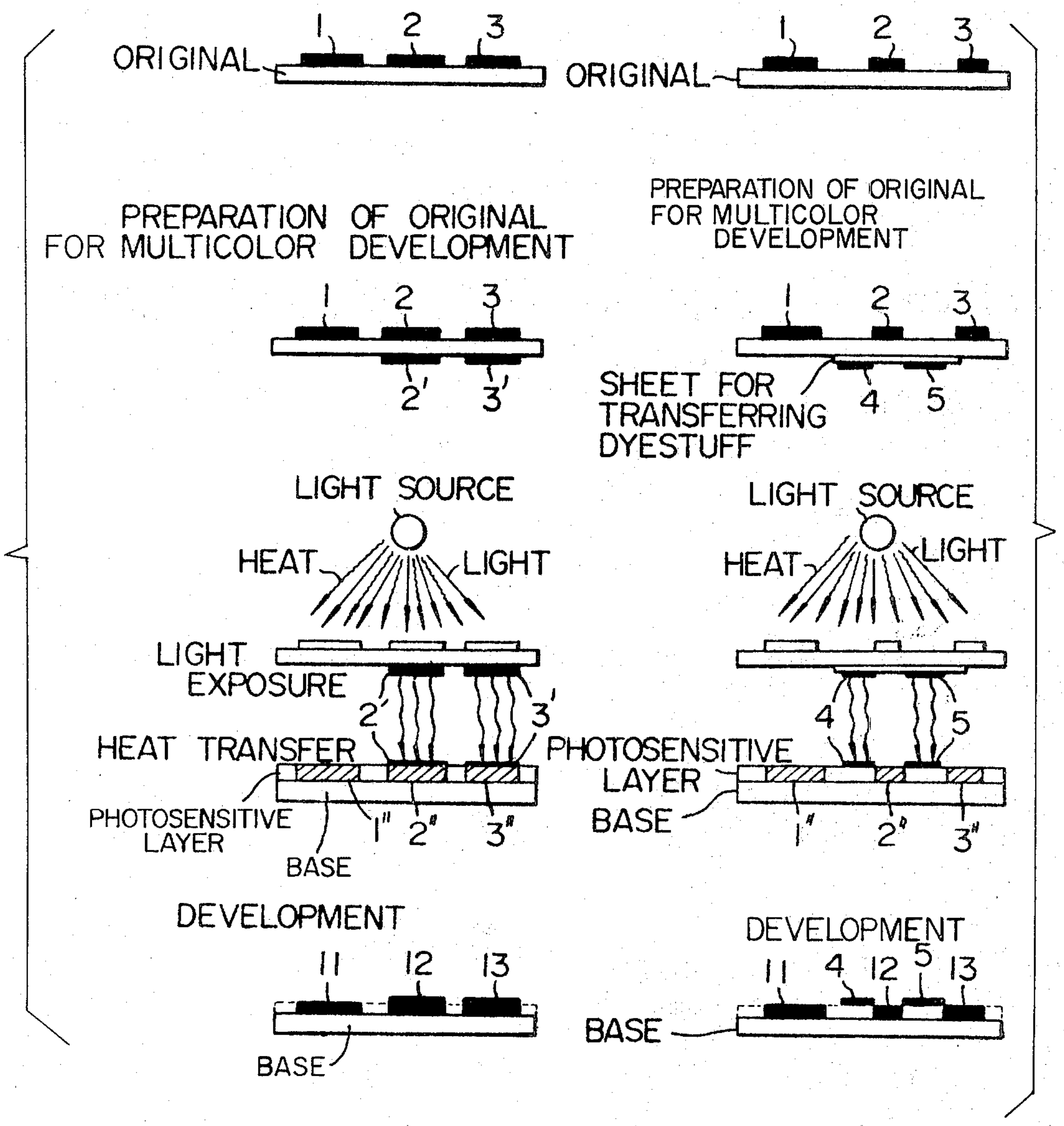

This invention relates to a process for diazo-type multicolor reproduction. More specifically, it relates to a process for diazo-type multicolor reproduction by which predetermined portions of an original can be reproduced electively into different hues.

It has been known that when two or more diazonium salts which have different resolving rates and exhibit different hues upon bonding with couplers are used in the diazo-type reproduction, copies can be obtained which are colored in two or more hues depending on the intensity of the light on the exposed portions. In such copies, image colors of the semi-exposed portions are mingled with image colors of non-exposed portions to form a compound color, and the color contrast becomes poor. Further in such reproduction process it is impossible to produce a multicolor copy of an original which has a similar image concentration or transmits the light evenly therethrough.

No diazo-type reproduction process has been known by which predetermined portions of an original can be reproduced into hues different from one another regardless of difference or similarity of the light transmission in the original.

It has now been found that predetermined portions of an original can be reproduced into different hues regardless of the difference or similarity of the light transmission in the original by conducting the steps of (A) exposing to light a diazo-type photosensitive material containing at least one diazonium salt and (B) heating a layer of at least one thermovolatile or thermosublimative dyestuff or pigment disposed between the original and the diazo-type photosensitive material in areas corresponding to image areas of the original predetermined to be reproduced in a different hue, the steps being carried out coincidentally or in an order of (A) to (B) or (B) to (A), to thereby effect the heat transfer of the thermovolatile or thermosublimative dyestuff or pigment, and developing the exposed photosensitive material in the presence of a coupler capable of coupling with the diazonium salt.

Any dyestuff or pigment that can be volatilized or sublimated by heating may be used as the thermovolatile or thermosublimative dyestuff or pigment in this invention. As such dyestuff or pigment solvent-soluble dyestuffs such as oil-soluble dyestuffs, spirit dyestuffs, smoke dyestuffs, triphenyl methane dyestuffs and disperse dyestuffs may be mentioned. It is generally preferred that these dyestuffs or pigments do not contain non-volatile groups such as sulfonic acid groups to facilitate the heat transfer of the dyestuff or pigment.

Examples of dyestuffs and pigments which may be used in this invention are as follows:

Oil-Soluble Dyestuffs:
- Oil Red TR: Color Index 21260
- Oil Red RC: Color Index 26105
- Oil Red 6B: Color Index 26125
- Oil Orange S: Color Index 12055
- Oil Brown SG: Color Index 12020
- Oil Brown PB: Color Index 12010
- Oil Yellow 3G: Color Index 12700
- SuperPink: Color Index 45170
- Super Green: Color Index 42000
- Super Yellow: Color Index 41000
- Super Violet: Color Index 42535
- Sudan Blue II: Color Index 2882

Disperse Dyestuffs
- Celliton Blue GR: Color Index 64500
- Celliton Blue TFB: Color Index 62035
- Celliton Yellow RR: Color Index 11345
- Celliton Scarlet B: Color Index 11110
- Celliton True Yellow RR: Color Index 11345

Smoke Dystuffs
- Sudan Red R: Color Index 12150

As the coupler capable of coupling with the diazonium salt used in combination of the above thermovolatile or thermosublimative dystuff or pigment, any coupler that is used in ordinary diazo-type reproduction may be used in practicing the process of this invention. As such coupler phenol derivatives, naphthol derivatives and active methylene group-containing compounds may be mentioned. Examples of these compounds are as follows:

Phenol Derivatives:
- Pyrocatechol
- Resorcin
- Phloroglucin
- Pyrogallol
- Resorcin monoglycol ether
- Resorcin diglycol ester
- Meta-aminophenol
- Para-aminophenol
- 2,5,6-Trimethyl phenol
- 2-Hydroxymethyl phenol
- $\beta$-(2-Hydroxyphenyl)-propionic acid
- 2-($\omega$-Phenylaminomethyl)-phenol
- $\beta$(4-Methyl-2-hydroxyphenyl)-glutaric acid
- 2,5-Dimethyl-6-(N-dimethylaminomethyl)-phenol
- 1,3-Dimethyl ether of pyrogallol
- N-Lauryl-para-aminophenol
- N-Acyl-meta-aminophenol
- Meta-hydroxy-acetoanilide
- Ortho-N-hydroxyphenyl-monoguanidine
- Para-N-hydroxyphenyl-biguanidine
- 2,5-Dimethyl-4-morpholinomethyl phenol
- 2-Methyl-5-iso-propyl-4-morpholinomethyl phenol
- 4-Morpholinomethylresorcinol monomethyl ether
- 3,3′-5,-Trihydroxydiphenyl
- 3,3′,5,5′-Tetrahydroxydiphenyl
- 2,2′,4,4′-Tetrahydroxydiphenyl
- 2,4,4′-Trihydroxydiphenyl-2′-sulfonic acid
- 2,4,6,3′,5′-pentahydroxydiphenyl
- 2,2′,4,4′-Tetrahydroxydiphenyl sulfide Naphthol Derivatives:

- 2,3-Dihydroxynaphthalene
- β-Naphthol
- α-Naphthol
- 1,6-Dihydroxynaphthalene
- 2,7-Dihydroxynaphthalene
- 2,3-Dihydroxynaphthalene-6-sulfonic acid
- 2-Naphthol-3,6-disulfonic acid
- 2,7-Dihydroxynaphthalene-3-sulfonic acid
- 2,8-Dihydroxynaphthalene-6-sulfonic acid
- 1,8-Dihydroxynaphthalene-8-sulfonic acid
- 1,8-Aminonaphthol-5-sulfonic acid
- 2,7-Dihydroxy-3,6-disulfonic acid
- 1,8-Benzoylaminonaphthol-2-sulfonic acid
- 1,8-Dihydroxynaphthalene-6-sulfonic acid
- 2-Hydroxy-3-naphthionic-N-β-hydroxyethyl amide
- 2-Hydroxy-3-naphthonic-N,N-bis-β-hydroxyethyl amide
- 8-Hydroxy-2-naphthonic-hydroxyethyl amide
- 1-(N-carboethoxymethylamino)-8-naphthol-4-sulfonic acid
- 5-(Para-nitro-benzamido)-1-naphthol
- 1-Hydroxynaphthyl-7-phenyl guanidine
- 2-Hydroxynaphthyl-8-biguanidine
- 1-Naphthol-3-(N-β-hydroxyethyl)-sulfonamide
- 1-Naphthol-3-(N-o-methoxyphenyl)-sulfonamide
- Bis-[5-hydroxy-7-sulfo-naphthyl(2)]-amine
- N,N-bis[-1hydroxy-3-sulfo-naphthyl(2)]-thiourea Active Methylene Group-Containing Compounds

- 1-Phenyl-3-methylpyrazolone (5)
- Acetoacetic acid anilide
- 1-Phenyl-3-carboxypyrazolone
- Acetoacetic acid cyclohexylamide
- Acetoacetic acid benzylamide
- Cyanoacetoanilide
- Cyanoacetomorpholine Heterocyclic Compounds:

- 1-(3′-Sulfoamido)-phenyl-3-methylpyrazolone-5
- 1-(4′-Carboxyethylphenyl)-3-dodecylpyrazolone-5
- 8-Hydroxy-1,2-naphthylimidazole
- 2-Methyl-4-hydroxybenzimidazole
- 7-Methyl-4-hydroxybenzothiazole
- 1,7-Dimethyl-4-hydroxybenztriazole
- 3-Hydroxythiophene-5-carboxylic acid
- 1-3-4-Cyclopentatrione In conducting the process of this invention, first an original for multicolor development is formed by applying at least one transparent or semi-transparent layer of a thermovolatile or thermosublimative dyestuff or pigment onto the back surface of one or more predetermined portions of a transparent or semi-transparent original to be reproduced.

The so-formed original for multicolor development is placed on a diazo-type photosensitive material containing at least one diazonium salt in a manner such that the layer of the thermovolatile or thermosublimative dyestuff or pigment will confront the photosensitive surface of the photosensitive material, and the light-exposure and heating are effected coincidentally or successively in this order or the reverse order. Thus, the thermovolatile or thermosublimative dyestuff or pigment is heat-transferred to the surface of the predetermined portion of the photosensitive material to form a colored image, and the light resolution of the diazonium salt occurs depending on the light transmission. When the so-exposed photosensitive material is developed by a known method, the diazonium salt at the non-exposed area reacts with a coupler present in the development system to form a dyestuff. As a result a multicolored copy in which the predetermined portion is colored in a hue different from that of the other portion is obtained.

The above-mentioned original for multicolor development may be prepared, for instance, by a method comprising applying a coating composition containing the above-mentioned thermovolatile or thermosublimative dyestuff or pigment on the back surface of a portion of a transparent or semi-transparent original predetermined to have a different hue, or by a method comprising coating or impregnating a transparent or semi-transparent substrate with the above coating composition to form a color-forming sheet or color-forming layer of a figure, pattern or the like and combining the resulting sheet or layer with the back surface of a specific portion of an original predetermined to have a different hue in a manner such that the layer of the thermovolatile or thermosublimative dyestuff or pigment will confront the photosensitive surface of a photosensitive material to be combined therewith.

A coating composition for treating the back surface of an original and transferring the dyestuff or pigment may be easily prepared by dispersing the dyestuff or pigment into a liquid or semisolid dispersion medium. Examples of such composition are shown below:

(1) Ink-like composition:

| | Percent |
|---|---|
| Heat-transferable dyestuff or pigment | 5.0–35.0 |
| Heat-transfer promoter | 0–15.0 |
| Binder | 0–5.0 |
| Dispersion assistant | 0–2.0 |
| Dispersion medium | Balance |

As the dispersion medium water and organic solvents such as alcohols, toluene, xylene, esters and methyl ethyl ketone may be used. A coloring material may be included so as to provide a clear indication of the treated areas and a sublimative substance such as camphor and naphthalene may be incorporated so as to promote the heat transfer of the dyestuff or pigment. Further, a binder is used to ensure adequate fixation of the dyestuff or pigment to the original.

Such a composition may be applied to predetermined areas of the back of the original by means of, for example, a brush, a felt pen, a ball pen, a coating roller, a sprayer or a printing machine.

(2) Waxy composition:

| | Percent |
|---|---|
| Heat-transferable dyestuff or pigment | 5.0–35.0 |
| Wax | 85.0–15.0 |
| Oil | 10–40.0 |
| Heat-transfer promoter | 0–15.0 |

Such waxy composition may be shaped into a crayon or stick which is used to apply the composition to predetermined areas of the back of an original. Pressure-sensitive transfer sheets may also be formed by melting the composition or dissolving it in a suitable solvent and coating the melt or solution onto a substrate such as paper and plastic film. The pressure-sensitive transfer sheet is then placed under the back surface of a sheet which is to serve as an original, and then pressure is applied to the front of the original, for example by means of a type-writer or other writing means, to form an image and a coating of the composition on the back surface of the original in areas corresponding to the image.

(3) Sheet for heat-transferring dyestuff or pigment:

Ink-like and waxy compositions described in (1) and (2) above are coated on a transparent or semi-transparent sheet such as paper, plastic film or non-woven fabric, or a suitable figure or patern is drawn on such substrate sheet. The coated sheet is cut into a suitable form of a figure, pattern or the like or into a suitable size, if desired, and then is applied to a predetermined portion of the back surface of an original. It is possible to form a pressure-sensitive adhesive layer on the back surface of the transfer sheet of the dye-stuff or pigment to prevent it from exfoliating from the original.

The so formed originals for multicolor reproduction may be used repeatedly, for example, 5 to 30 times, to produce multicolor copies. The number of times an original can be used will depend on the amount of the dyestuff or pigment, the method of coating, the method of heating and the method of development. Of course, when the dyestuff or pigment on the back of the original is exhausted and the ability of the transfer sheet is lowered, additional dyestuff or pigment can be applied.

In accordance with this invention, the above-mentioned original for multicolor reproduction is placed on the photosensitive material in a manner such that the layer for transferring the dyestuff or pigment will confront the photosensitive surfaces of the photosensitive material, and the assembly is exposed to light and heated.

Various photosensitive materials containing a diazonium salt may be used in this invention depending on the type of the developing method. They are usually formed by coating a composition containing a diazonium compound and, if necessary, a coupler, on a substrate such as paper, plastic film, fibrous fabric, non-woven fabric and metal foil. Suitable examples of such photosensitive materials are as follows:

A. Sensitizing composition for dry development:

| | Percent |
|---|---|
| Azo coupling component | 0.2–5.0 |
| Diazonium compound | 0.2–5.0 |
| Organic acid | 0.1–5.0 |
| Coloring matter | 0.001–0.025 |
| Development promoter | 1.0–10.0 |
| Extender | 0–2.5 |
| Solvent | Balance |

The sensitizing composition of the above recipe is coated on a substrate such as paper and plastic film and dried to form a photosensitive sheet.

B. Two-component-type sensitizing composition for wet development:

| | Percent |
|---|---|
| Azo coupling component | 0.2–5.0 |
| Diazonium compound | 0.2–5.0 |
| Organic acid | 0.1–5.0 |
| Extender | 0–2.5 |
| Stabilizer | 0–5.0 |
| Coloring matter | 0.001–0.025 |
| Solvent | Balance |

The sensitizing composition of the above recipe is coated on a substrate such as paper and plastic film to form a photosensitive sheet.

C. One-component-type sensitizing composition for wet development:

| | Percent |
|---|---|
| Diazonium compound | 0.2–5.0 |
| Organic acid | 0.1–5.0 |
| Extender | 0–2.5 |
| Coloring matter | 0.001–0.025 |
| Solvent | Balance |

The sensitizing composition of the above recipe is coated on a substrate such as paper, and dried to form a photosensitive sheet.

As the diazonium compound, any diazonium compound that can couple with the above-mentioned coupler under ordinary developing conditions can be used. Typical examples of such diazo compounds are mentioned below:

Para-phenylene-diamine-N,N-substituted compounds of the following general formula:

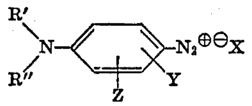

wherein X stands for an anion, R' and R'' each are aliphatic groups, and Z and Y denote groups which can be introduced into the benzene nucleus.

Specific examples of the compounds of this type are as follows:

4-Diazo-N,N-dimethyl aniline (referred to simply as "MA salt")
4-Diazo-N,N-diethyl aniline (referred to simply as "EA salt")
4-Diazo-N-ethyl-N-β-hydroxyethyl aniline (referred to simply as "EH salt")
4-Diazo-N,N-bis-β-hydroxyethyl aniline
4-Diazo-N-methyl-N-β-hydroxyethyl aniline.
4-Diazo-N-ethyl-N-β-hydroxypropyl aniline Other diazonium salts of p-phenylene diamines N,N-substituted with alkyl or hydroxy-alkyl groups:

4-Diazo-N-ethyl-N-(β-diethylamino)-ethyl aniline
4-Diazo-2-chloro-N,N-diethyl aniline
4-Diazo-2-methyl-N,N-diethyl aniline
4-Diazo-2-iodo-N,N-diethyl aniline
4-Diazo-2-trifluoromethyl-N,N-diethyl aniline
4-Diazo-N-ethyl-N-benzyl aniline
4-Diazo-N-methyl-N-benzyl aniline (referred to simply as "methyl benzyl")

Aminohydroquinone ether-type compounds of the following general formula:

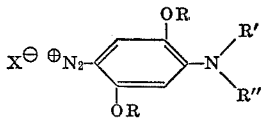

wherein R, R' and R'' are alkyl or aryl groups and X stands for an anion.

Specific examples of the compounds of the above type are as follows:

4-Diazo-2,5-dibutoxy-N,N-diethyl aniline
4-Diazo-2,5-diethoxy-N-benzoyl aniline (referred to simply as "BB salt")
4-Diazo-2,5-diethoxy-N-ethyl-N-benzoyl aniline
4-Diazo-2,5-dibenzyloxy-N-benzoyl aniline
4-Diazo-2-chloro-5-methoxy-N-benzoyl aniline
4-Diazo-2,5-diethoxy-N-benzoyl-methyl aniline
4-Diazo-2,5-diethoxy-N-benzoyloxy-methyl aniline
Other 4-diazo-2,5-dioxyalkyl (or dioxyaryl)-N-alkyl (or aryl) compounds and derivatives thereof Aminodiphenyl compounds, aminodiphenyl amine compounds and their analogues of the following general formulas:

$$X^{\ominus\oplus}N_2\text{—R—A—R}' \text{ and } X^{\ominus\oplus}N_2\text{—R—A—R}'^{\oplus\ominus}X$$

wherein X is an anion, R is a divalent aryl group, R' is a monovalent or divalent aryl or alkyl group, A is a divalent group or a direct bond and examples of the R—A—R' are diarylamine (A; —NH—), diphenyl A; (direct bond), diphenyl oxide (A; —O—), diaryl methane (A; —$CH_2$—), stilbene (A; —CH=CH—) and diaryl or dialkyl sulfide (A; —S).

Specific examples of the compounds of the above type are as follows:

Para-diazophenyl amine
4-Diazo-2,5,4'-triethoxydiphenyl amine
4-Diazo-2,5,4'-triethoxydiphenyl
4,4'-Bis-diazo-2,2',5,5'-tetrahydroxydiphenyl methane
Bis-diazo-3,3'-dichloro-5,5'-dimethoxy benzidine
4-Diazo-2,5-dimethoxyphenylethyl sulfide
4-Diazo-2,5-diethoxy-4'-methyl-diphenyl sulfide Heterocyclic amine derivatives of the following general formula:

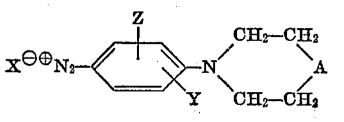

wherein X stands for an anion, Y and Z are groups which can be introduced into the benzene nucleus, and A is a direct bond (phenyl pyrrolidine) or a divalent group such as —O— (morpholine), —S— (thiomorpholine) and methylene (phenylpiperidine).

Specific examples of the compounds of this type are as follows:

4-Diazo-2,5-dibutoxy-N-phenyl morpholine
4-Diazo-2,5-diethoxy-N-phenyl morpholine
4-Diazo-2-methoxy-N-thio morpholine
4-Diazo-N-phenyl piperidine
4-Diazo-N-phenyl pyrrolidine
4-Diazo-2,5-di-n-butoxy-N-phenyl piperidine
Other derivatives of 4-Diazo-N-phenyl heterocyclic amines.

N,N-Substituted ortho-phenylene diamine derivatives and orthoamine-phenol derivatives.

Specific examples of the compounds of this type are as follows:

2-Diazo-4-methylmercapto-N,N'-dimethyl aniline
2-Diazo-5-benzoylamino-N,N'-dimethyl aniline
2-Diazo-1-naphthol-5-sulfonic acid The above-mentioned diazonium compounds may be used in the form of a relatively stable salt with sulfuric acid or hydrochloric acid. They may be also used in the form of a double salt with zinc chloride, tin chloride, aluminum sulfate or the like. Further, they may be used in the state stabilized by an aryl sulfonate (in the form of a diazonium salt of an aromatic sulfonic acid), a diazosulfonate or the like.

The exposure of the photosensitive material and the transfer of the thermovolatile or thermosublimative dyestuff or pigment to the photosensitive surface may be effected coincidentally. For instance, when a mercury lamp is used as the light source for exposure, the heat transfer of the dyestuff or pigment may be effected coincidentally with the exposure by the heat conveyed through a cylinder glass of the light source maintained at a relatively high temperature. Of course, the heat transfer of the dyestuff or pigment may be also effected by the radiation heating of an image of the original. The heat transfer of the dyestuff or pigment may be effectively performed by heating the layer for heat-transferring the dyestuff or pigment at a temperature above 80° C., preferably 150–250° C. or above, though a preferable heating temperature varies to some extent depending on the kind of the dyestuff or pigment and the heating time.

It is also possible to adopt a method comprising piling the above-mentioned original for multicolor development and the photosensitive material, passing the assembly through a heated roller or an infrared radiation zone to heat the layer for heat-transferring the dyestuff or pigment at the above-mentioned temperature and to effect the heat transfer of the dyestuff or pigment, and then passing the same through an exposure zone to effect the exposure of the photosensitive material.

It is also possible to adopt a method in which the exposure and heat transfer are conducted in an order reverse to that of the above method, namely a method comprising piling the original for multicolor development and the photosensitive material, passing the assembly through an exposure zone to effect the exposure of the photosensitive material and then passing the same through a heating zone to effect the heat transfer of the dyestuff or pigment.

The photosensitive material which has been exposed to light and on a predetermined portion of which the dyestuff or pigment has been heat-transferred to form a colored image, is developed in the presence of a coupler by customary known developing methods. The coupler may be either contained in the photosensitive material in advance or present in a developer. The development may be conducted by either a dry method or a wet method.

In the case of the dry development, the development is accomplished sufficiently by exposing the light-exposed photosensitive material to a mixture of ammonia and steam. When a one-component-type photosensitive sheet for wet development is used, the development may be accomplished by dipping, roller coating or spraying methods with use of a liquid developer having, for instance, the following recipe:

| | |
|---|---|
| Coupler | 0.2–5 |
| Alkali | 0.5–10 |
| Reducing agent | 0–20 |
| Surface active agent | 0–0.5 |
| Water | Balance |

When a two-component-type photosensitive sheet for wet development is used, the development may be accomplished by contacting the light-exposed photosensitive sheet with a liquid developer containing an alkali.

As a result, multicolored copies in which areas corresponding to predetermined portions of an original are colored with the thermovolatile or thermosublimative dyestuff or pigment and other areas are colored by the coupling of the diazonium salt with the coupler are obtained.

Figure 3:
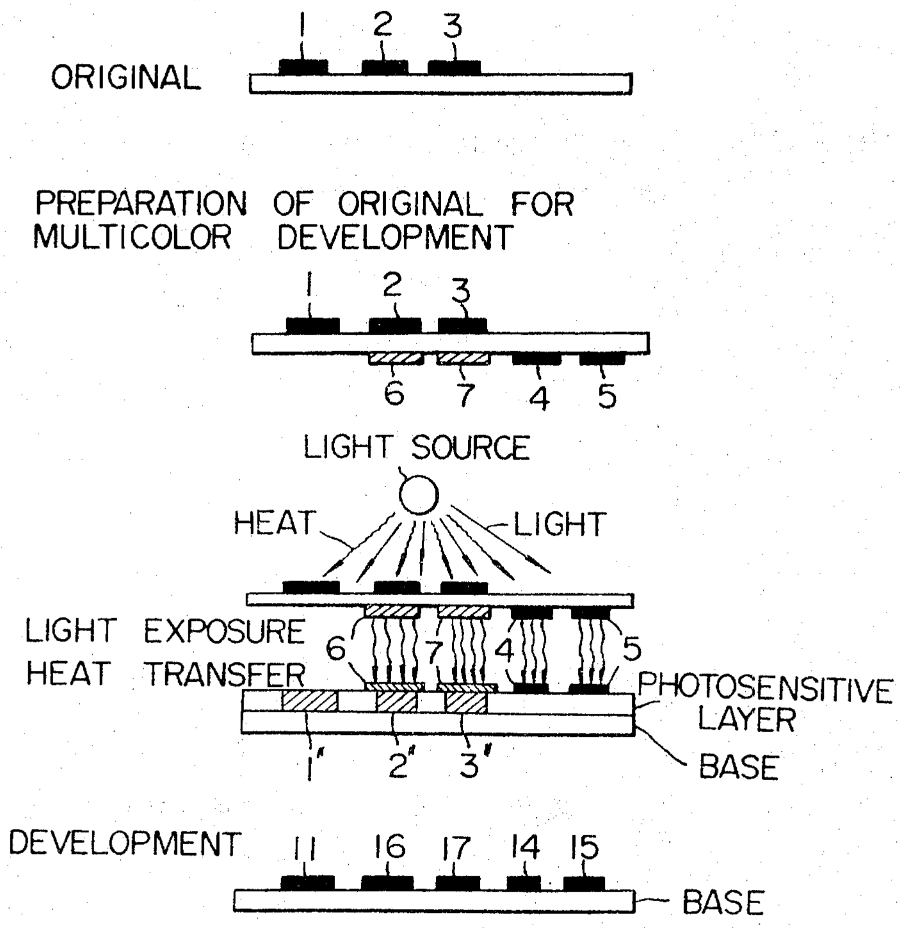

The process of this invention will now be explained by referring to accompanying drawings, in which FIGS. 1, 2 and 3 are given to explain the multicolor reproduction process of this invention.

In FIG. 1, different thermovolatile or thermosublimative dyestuffs or pigments 2' and 3' are coated on the back surface of image areas 2 and 3, respectively, of an original having image areas 1, 2 and 3. When this original is placed over a photosensitive sheet and exposed to light emitted from a suitable light source, latent images 1'', 2'' and 3'' corresponding to image areas 1, 2 and 3 are formed on the photosensitive sheet. At the same time, the dyestuffs or pigments 2' and 3' are transferred by the heat from the light source to the upper surface of the photosensitive sheet in areas 2'' and 3''. When the exposed photosensitive sheet carrying the so transferred dyestuffs or pigments 2' and 3' is developed, the diazonium salt in latent images 1'', 2'' and 3'' reacts with a coupler in the photosensitive sheet. As a result, a coloring matter resulting from the reaction between the diazonium salt and coupler is formed in the latent image area 1'', and in latent image areas 2'' and 3'' mixtures of the heat-transferred dyestuffs or pigments with the above coloring matter formed by the reaction between the diazonium salt and coupler are respectively formed. Thus, there is a multicolor copy which has image areas 11, 12 and 13, corresponding to original areas 1, 2 and 3 respectively, colored in different hues.

In FIG. 2, a heat-transfer sheet having image areas 4 and 5 of thermovolatile or thermosublimative dyestuffs or pigments is applied onto the back surface of an original having image areas 1, 2 and 3. The original for multicolor reproduction is piled on a photosensitive sheet and exposed to light emitted from a suitable light source. Thus, latent images 1'', 2'' and 3'' corresponding to images 1, 2 and 3, respectively, are formed on the photosensitive sheet. At the same time, dyestuffs or pigments 4 and 5 are transferred to the upper surface of the photosensitive sheet by the heat from the light source to form colored images. When the sheet is developed, the diazonium salt in latent image areas 1'', 2'' and 3'' reacts with a coupler contained in the photosensitive sheet. As a result a multicolored copy which has images 11, 12 and 13 and transferred images 4 and 5 of the dyestuffs or pigments, each being colored in a different hue is obtained.

In accordance with this invention, it is possible to obtain copies in which predetermined portions are colored selectively in different hues. Further, when the original has once been treated, at least 5 sheets, generally 30 or more sheets, of multicolored copies can be obtained from the original, and therefore, it is unnecessary to repeat the treatment of the original for every copy.

The reproduction process of the invention is particularly advantageous for reproducing important or significant portions of originals such as papers, drawings, charts and books in hues different from those of other portions and is effective for obtaining ordinary multicolor copies.

In the above-explained embodiment of the invention, predetermined portions of the back of an original are treated with thermovolatile or thermosublimative dyestuffs or pigments. In another embodiment of the invention, some predetermined portions of the back of an original are treated with the dyestuffs or pigments and other predetermined portions are treated with at least one thermovolatile or thermosublimative coupler (which will be referred to as "coupler (*a*)"). As a result, an original for multicolor reproduction is obtained whose back has been treated with both the thermovolatile or thermosublimative dyestuff or pigment and the thermovolatile or thermosublimative coupler (*a*). This treatment is accomplished by a method comprising coating the dyestuff or pigment and the coupler (*a*) onto the back of an original or a method comprising applying transparent or semi-transparent sheets coated or impregnated with the dyestuff or pigment and the coupler (*a*). It is also possible to adopt a combination of the above two methods. When, by employing the so formed original for multicolor reproduction, the steps of (A) exposing to light a diazo-type photosensitive material containing at least one diazonium salt (*c*) and (B) heating the treated areas of the back of the original disposed in face-to-face contact with the diazo-type photosensitive material, coincidentally or in an order of (A) to (B) or (B) to (A), and then the photosensitive material is developed in the presence of a coupler (which will be referred to as "coupler (*b*)") having a lower coupling rate under developing conditions than that of the thermovolatile or thermosublimative coupler (*a*), a multicolored copy can be obtained in which areas corresponding to the treated areas of the original are colored in different hues from one another and from areas corresponding to untreated portions of the original.

In this embodiment, it is essential that among the thermovolatile or thermosublimative coupler (*a*), the coupler (*b*) and the diazonium salt (*c*) there should be established the following relations:

(I) The thermovolatile or thermosublimative coupler (*a*) has a higher coupling rate under developing conditions than the coupler (*b*).

(II) Dyestuff (*b*)–(*c*), dyestuff (*a*)–(*c*), dyestuff (*a'*)–(*c*) . . . formed at the development have hues different from one another.

Any compound that can be volatilized or sublimated by heating and that will couple with a photosensitive diazonium salt may be used as the thermovolatile or thermosublimative coupler (*a*). Suitable compounds include phenol derivatives, hydroxynaphthalene derivatives, aniline derivatives and compounds containing an active methylene group. It is generally preferred that these compounds do not contain such solubilizing groups as sulfonic acid groups in order to facilitate the heat transfer operation.

Specific examples of such couplers are as follows:

Phenol Derivatives:
- Resorcin
- Pyrogallol
- 4-Chlororesorcin
- 4-Bromoresorcin Hydroxynaphthalene Derivatives:
- 2,3-Dihydroxynaphthalene
- 1,6-Dihydroxynaphthalene
- 1,7-Dihydroxynaphthalene
- 2,7-Dihydroxynaphthalene Aniline Derivatives:
- Meta-aminophenol
- Ortho-aminophenol
- Dimethyl meta-aminophenol Active Methylene Group-Containing Compounds:
- 1-Phenyl-3-methyl-pyrazolone (5)
- Acetoacetic acid anilide
- 1-(3'-Chlorophenyl)-3-methyl-pyrazolone (5)
- 3-Methyl-pyrazolone (5)
- 1-(Para-toluyl)-3-methyl-pyrazolone (5)

As coupler (*b*) to be used in combination with the above coupler (*a*), any coupler that has a lower coupling rate under the same developing conditions than the specific instance of coupler (*a*) actually used may be employed. In case a plurality of the thermovolatile or thermosublimative couplers (*a*) are used, the coupling rate of the coupler (*b*) should be lower than that of any of couplers (*a*). Selection of a suitable combination of couplers (*a*) and (*b*) meeting the above requirement from couplers exemplified hereinabove with respect to the coupler to be used in this invention may be readily done by those skilled in the art based on simple experiments.

In this embodiment, it is preferred that a combination of a thermovolatile or thermosublimative dyestuff or pigment and a thermovolatile or thermosublimative coupler (*a*), whose volatilizing or sublimating temperatures approximate each other, is used.

In accordance with the above embodiment of this invention, multicolored copies can be obtained which have areas colored in different hues by thermovolatile or thermosublimative dyestuffs or pigments and by dyestuffs formed by thermovolatile or thermosublimative couplers.

The above embodiment will now be explained in detail by reference to FIG. 3.

Different thermovolatile or thermosublimative couplers 6 and 7 are coated on image areas 2 and 3 of the back surface of an original having images 1, 2 and 3, and reverse image patterns 4 and 5 are formed on other areas of the back surface of the original with use of different thermovolatile or thermosublimative dyestuffs or pigments. As a result an original for multicolor reproduction is obtained.

The back surface of the original for multicolor reproduction is placed on the photosensitive surface of a photosensitive material, and the assembly is exposed to light emitted from a suitable light source. Latent images 1'', 2'' and 3'' corresponding to images 1, 2 and 3, on the photosensitive layer of the photosensitive material are formed. At the same time, couplers 6 and 7 are transferred onto the photosensitive layer by the heat from the light source, as well as thermovolatile or thermosublimative dyestuffs or pigments 4 and 5.

When the exposed photosensitive material is developed, the diazonium salt in latent image areas 2'' and 3'' reacts selectively with the transferred couplers 6 and 7, while the diazonium salt in the latent image 1'' reacts with a coupler incorporated in advance in the photosensitive layer.

As a result a copy which has images 11, 16, 17, 14 and 15 colored in different hues is obtained.

This invention will be described hereinbelow by referring to examples.

PREPARATION OF COMPOSITION CONTAINING THERMOVOLATILE OR THERMOSUBLIMATIVE DYESTUFFS OR PIGMENTS

Examples of Preparation of Ink-Like Compositions

Example A

An ink-like composition of the following recipe provides a yellow color-forming agent for treating the back surface of an original:

| | | |
|---|---|---|
| Oil Yellow 3G (Color Index 12700) | g | 20 |
| Alkyd resin | g | 5 |
| Toluol | ml | 100 |

This composition can be directly used to coat a portion of the back surface of an original desired to be reproduced in yellow by means of a brush, a coating roller or a sprayer, or after it has been charged in a felt pen or a ball pen, it is applied on the back surface of a portion of an original desired to be reproduced in yellow. Alternatively, an yellow image-forming sheet is prepared by coating or impregnating a transparent or semi-transparent sheet with the above composition, and the resulting sheet is disposed between an original and a photosensitive material to form an original for multicolor reproduction.

Example B

An ink-like composition for treating the back surface of an original, which resembles that of Example A, is prepared by using Super Yellow (Color Index 41000) instead of the Oil Yellow 3G in Example A.

Example C

An ink-like composition of the following recipe is prepared as a red color-forming agent:

| | | |
|---|---|---|
| Oil Red TR (Color Index 21260) | g | 20 |
| Silicone resin | g | 5 |
| Toluene | ml | 70 |
| Xylene | ml | 30 |

This composition is directly used as an agent to be coated on a portion of the back surface of an original desired to be reproduced in red by means of a brush, a coating roller or a sprayer, or after being charged in a felt pen or a ball pen, it is used as an agent for treating the back surface of a portion of an original desired to be reproduced in red or as an agent for treating a transparent or semi-transparent sheet to be disposed between an original and a photosensitive material.

Example D

A similar treating composition is prepared by employing Oil Red RC (Color Index 26105) instead of the Oil Red TR in Example C.

Example E

An ink-like composition of the following recipe is prepared as a blue color-forming agent:

| | | |
|---|---|---|
| Celliton Blue GR (Color Index 64500) | g | 20 |
| Linseed oil-modified alkyd resin | g | 5 |
| Toluene | ml | 100 |

This composition is directly used as a blue color-forming agent to be coated on the back surface of a portion of an original desired to be reproduced in blue by a coating roller, a brush or a sprayer, or after it has been installed in a felt pen or a ball pen, it is used as an agent for treating the back surface of a portion of an original desired to be reproduced in blue, or as an agent for treating a transparent or semi-transparent sheet to be disposed between an original and a photosensitive material.

Example F

An ink-like composition of the following recipe provides a brown color-forming agent:

| | | |
|---|---|---|
| Oil Brown SG (Color Index 12020) | g | 20 |
| Camphor | g | 10 |
| Styrene resin | g | 5 |
| Toluene | ml | 100 |

This composition is directly used as an agent to be coated on a portion of the back surface of an original desired to be reproduced in brown by means of a brush, a coating roller or a sprayer, or after it has been charged into a felt pen or a ball pen, it is used as an agent for treating the back surface of a portion of an original desired to be reproduced in brown or as an agent for treating a transparent or semi-transparent sheet to be disposed between an original and a photosensitive material.

Example G

An ink-like composition of the following recipe provides an orange color-forming agent:

| | | |
|---|---|---|
| Oil Orange S (Color Index 12055) | g | 20 |
| Silicone resin | g | 5 |
| Naphthalene | g | 10 |
| Toluene | ml | 100 |

This composition is directly used as an agent to be coated on a portion of the back surface of an original desired to be reproduced in orange, or after it has been charged in a felt pen or a ball pen, it is used as an agent for treating a portion of the back surface of an original desired to be reproduced in orange or as an agent for treating a transparent or semi-transparent sheet to be disposed between an original and a photosensitive sheet.

Example H

An ink-like composition of the following recipe provides a pink color-forming agent:

| | | |
|---|---|---|
| Super Pink (Color Index 45170) | g | 20 |
| Alkyd resin | g | 5 |
| Toluene | ml | 100 |

This composition is directly used as an agent to be coated on a portion of the back surface of an original desired to be reproduced in pink, or after it has been installed in a felt pen or a ball pen, it is used as an agent for treating a portion of the back surface of an original desired to be reproduced in pink or an agent for treating a transparent or semi-transparent sheet to be disposed between an original and a photosensitive material.

Example I

An ink-like composition to be used as a green color-forming agent for treating the back surface of an original is prepared by employing Super Green (Color Index 42000) instead of the Super Pink in Example H.

Example J

An ink-like composition of the following recipe provides a blue color-forming agent:

| | | |
|---|---|---|
| Celliton Blue FFB (Color Index 62035) | g | 20 |
| Vinyl acetate resin emulsion | g | 5 |
| Water | ml | 100 |

This composition is directly used as an agent to be coated on a portion of the back surface of an original desired to be reproduced in blue by means of a coating roller, a brush or a sprayer, or after it has been charged in a felt pen or a ball pen, it is used as an agent for treating a portion of the back surface of an original desired to be reproduced in blue or as an agent for treating a transparent or semi-transparent sheet to be disposed between an original and a photosensitive sheet.

Example K

An ink-like composition to be used as a red color-forming agent for treating the back surface of an original is prepared by employing Celliton Scarlet B (Color Index 11110) instead of the Celliton Blue FFB in Example J.

Examples of Preparation of Waxy Compositions

Example L

A waxy composition to be used as a yellow color-forming agent for treating the back surface of an original is prepared by heat melting

| | G. |
|---|---|
| Oil Yellow 3G (Color Index 12700) | 30 |
| Stearic acid | 100 |
| Paraffin | 50 |
| Terra alba | 50 |
| Diatomaceous earth | 20 |

and solidifying the melt.

This composition can be molded into a crayon and used to coat a portion of the back surface of an original desired to be reproduced in a different hue or as an agent for treating the back surface of a transparent or semi-transparent sheet to be applied to the back surface of an original.

Example M

To the composition of Example L 100 g. of mineral oil and 50 g. of oleic acid are added and the mixture is kneaded in a ball mill to disperse the additional components unformly. Then, the mixture is coated on a substrate such as paper to obtain a pressure-sensitive copying sheet. The so formed sheet is overlapped with the back surface of an original and pressure is applied thereto by means of a type-writer or other writing means to form a layer of the waxy composition on the back surface of an image of an original to be reproduced in a different hue. Or, the sheet is used to form a layer of the waxy composition, by a similar method to that described above, on the back surface of a transparent or semi-transparent sheet to be disposed between an original and a photosensitive sheet.

Example N

A waxy composition to be used as a red color-forming agent is prepared by heat melting

| | G. |
|---|---|
| Oil Red TR (Color Index 21260) | 30 |
| Paraffin | 50 |
| Terra alba | 70 |
| Haze wax | 20 |
| Stearic acid | 100 |
| Magnesium carbonate | 20 |

and solidifying the melt.

This composition can be molded into a crayon or stick and used as an agent to be coated on a portion of the back surface of an original desired to be reproduced in a different hue or as an agent to be coated on the back surface of a transparent or semi-transparent sheet to be disposed between an original and a photosensitive material.

Example O

To the composition of Example N 100 g. of mineral oil and 30 g. of oleic acid are added, and the mixture is kneaded in a ball mill. The kneaded mixture is coated on a substrate such as paper and dried to form a pressure-sensitive sheet. In the same manner as in Example M the sheet is used for forming a layer of the waxy composition on the back surface of an original or on the back surface of a transparent or semi-transparent sheet to be disposed between an original and a photosensitive material.

Example P

A waxy composition of the following recipe provides an agent for forming a blue color:

| | G. |
|---|---|
| Celliton Blue GR (Color Index 64500) | 30 |
| Stearic acid | 100 |
| Paraffin | 50 |
| Diatomaceous earth | 30 |
| Haze wax | 20 |

This composition can be molded into a crayon or stick and may be used to coat the back surface of an original desired to be reproduced in a different hue or to coat the back surface of a transparent or semi-transparent sheet to be disposed between an original and a photo-sensitive sheet.

Example Q

To the composition of Example P 100 g. of mineral oil and 30 g. of oleic acid are added together with 50 ml. of ethanol. The mixture is kneaded in a ball mill, coated on a substrate such as paper and dried to form a pressure-sensitive copying sheet. In the same manner as in Example M the sheet is used for forming a layer of the waxy composition on the back surface of an original or on the back surface of a transparent or semi-transparent sheet to be disposed between an original and a photosensitive material.

Example R

A waxy composition to be used as a brown color-forming agent is prepared by heat melting

| | G. |
|---|---|
| Oil Brown PB (Color Index 12010) | 30 |
| Paraffin | 50 |
| Terra alba | 70 |
| Haze wax | 20 |
| Stearic acid | 100 |
| Magnesium carbonate | 20 |

and solidifying the melt.

This composition can be molded into a crayon or stick and used as an agent to coat a portion of the back surface of an original desired to be reproduced in a different hue or on the back surface of a transparent or semi-transparent sheet to be disposed between an original and a photosensitive material.

Example S

To the composition of Example R 100 g. of mineral oil and 50 g. of oleic acid are added. The mixture is kneaded in a ball mill to disperse additional components uniformly and coated on a substrate such as paper to form a pressure-sensitive copying sheet. The so formed sheet is overlapped with the back surface of an original and pressure is applied thereto by means of a typewriter or other writing means to form a layer of the waxy composition on the back surface of an image of an original to be reproduced in a different hue. Or, the sheet is used to form a layer of the waxy composition, by a similar method to that described above, on the back surface of a transparent or semi-transparent sheet to be disposed between an original and a photosensitive sheet.

EXAMPLES OF PREPARATION OF COMPOSITIONS CONTAINING THERMOVOLATILE OR THERMO-SUBLIMATIVE COUPLER

Example T

An ink-like composition of the following recipe provides a red color-forming agent:

| | | |
|---|---|---|
| 1-Phenyl-3-methyl-pyrazolone (5) | g. | 20 |
| Vinyl acetate resin | g. | 5 |
| Methanol | ml. | 100 |

This composition can be directly used to coat a portion of the back surface of an original desired to be reproduced in red to brown by means of a brush, a coating roller or a sprayer, or after it has been charged in a felt pen or a ball pen, it is applied on a portion of the back surface of an original desired to be reproduced in red to brown.

Example U

A waxy composition to be used as a yellow color-forming agent is prepared by heat melting

| | G. |
|---|---|
| Acetoacetic acid anilide | 30 |
| Stearic acid | 100 |
| Paraffin | 50 |
| Terra alba | 50 |
| Diatomaceous earth | 20 |

and solidifying the melt.

This composition is molded into a crayon and used to coat a portion of the back surface of an original desired to be reproduced in a different color.

EXAMPLES OF MULTICOLOR REPRODUCTION

Example 1.—Multicolor-forming diazo-type photosensitive paper for wet development 10 grams of a double salt of 4-diazo-2,5-diethoxybenzoylaniline chloride·½$ZnCl_2$, 8 g. of citric acid, 0.1 g. of Patent Blue and 10 g. of dextrin are successively dissolved in water, to make 1 liter of a solution. The solution is coated on a base paper by means of an air knife coater and dried to obtain a diazo-type photosensitive sheet for wet development. The photosensitive paper is overlapped on an original in which a portion of the back surface is treated with the treating material of Example A and another portion of the back surface is treated with the treating material of Example C. Then, the assembly is heated and printed by means of a mercury lamp to effect the heat transfer of the dyestuffs contained in the treating materials. As a result, a copy is obtained in which a portion corresponding to the portion of the original treated with the treating material of Example A is colored in yellow and a portion corresponding to the portion of the original treated with the treating material of Example C is colored in red and which has a latent image in the remaining portion corresponding to the untreated portion of the original. Then, the copy is developed with use of a liquid developer of the following recipe:

| | G. |
|---|---|
| NW acid | 20 |
| Potassium carbonate | 20 |
| Sodium thiosulfate | 40 |
| Sodium bicarbonate | 30 |
| Activating agent | 1 |
| Water | Balance |

Total: 1 liter.

As a result, the latent image area of the copy is colored in bluish violet to obtain a clear multicolor reproductive copy.

Example 2

Instead of the original-treating materials used in Example 1, the treating materials of Examples L and N are employed and the procedures of Example 1 are repeated. As a result a multicolor copy similar to that obtained in Example 1 is obtained.

Example 3.—Multicolor-forming diazo-type photosensitive paper for dry development A solution of the following recipe is prepared:

| | G. |
|---|---|
| 4 - Diazo-N-ethyl-N-β-hydroxyethylaniline chloride·½$ZnCl_2$ | 10 |
| Diethylene glycol | 50 |
| Citric acid | 20 |
| Bis-[5-hydroxy-7-sulfonaphthyl(2)]-amine | 15 |
| Zinc chloride | 40 |
| Thiourea | 30 |
| Patent Blue | 0.1 |
| Water | Balance |

Total: 1 liter.

The solution is coated on a base paper by a customary coating method such as using an air knife coater and dried to form a photosensitive sheet.

The sheet is placed on an original in which a portion of the back surface is treated with the ink-like composition of Example B, another portion of the back surface is treated with the ink-like composition of Example C and still another portion of the back surface is treated with the ink-like composition of Example F. Then, the assembly is heated and exposed to light by means of a mercury lamp. Thus, on the photosensitive sheet a latent image of the diazonium salt is formed, and the sheet is colored in yellowish orange in the portion corresponding to the portion of the original treated with the composition of Example B, in reddish brown in the portion corresponding to the portion of the original treated with the composition of Example C, and in brown in the portion corresponding to the portion of the original treated with the composition of Example F. The sheet is then developed with a mixed gas of ammonia and steam. Thus, the latent image present in the portion corresponding to the untreated portion of the original is colored in dark blue and a four-color copy is obtained.

Example 4.—Multicolor-forming photosensitive paper for dry development

A solution of the following recipe is prepared:

| | G. |
|---|---|
| 4-Diazo-N,N-dimethylaniline chloride·½$ZnCl_2$ | 10 |
| Diethylene glycol | 40 |
| Citric acid | 30 |
| 2,3-Dihydroxynaphthalene-6-sulfonic acid | 8 |
| Zinc chloride | 50 |
| Thiourea | 50 |
| Patent Blue | 0.1 |
| Water | Balance |

Total: 1 liter.

The solution is coated on a base paper by means of an air knife coater and dried to form a photosensitive sheet. The sheet is placed on an original in which a part of a desired image is formed with the pressure-sensitive sheet of Example M and another portion of the image is formed with the pressure-sensitive sheet of Example O, in a manner such that the photosensitive surface of the photosensitive sheet will confront the layers of the waxy compositions applied to the original. Then, the assembly is exposed to light emitted from a mercury lamp and then heated. Thus, a latent image of the diazonium salt is formed, and by the heat transfer of the dyestuffs, the photosensitive sheet is colored in red in the portion corresponding to the image portion of the original treated with the treating material of Example M and in red in the portion corresponding to the image portion of the original treated with the treating material of Example O. The resulting sheet is developed with a mixed gas of ammonia and steam. As a result, the latent image portion is colored in bluish violet and a three-color reproductive copy is obtained.

Example 5.—Multicolor-forming photosensitive paper for dry development

A solution of the following recipe is prepared:

| | | |
|---|---|---|
| 4-Diazo-N,N-diethylaniline chloride·½$ZnCl_2$ | g. | 15 |
| Diethylene glycol | ml. | 10 |
| Tartaric acid | g. | 25 |
| α-Resorcylic acid ethanolamine | g. | 20 |
| Zinc chloride | g. | 25 |
| Thiourea | g. | 25 |
| Sodium 1,3,6-naphthalene-trisulfonate | g. | 15 |
| Patent Blue | g. | 0.1 |
| Water | | Balance |

Total: 1 liter.

The solution is coated on a base paper by means of an air knife coater and dried to form a photosensitive sheet. The sheet is placed on an original in which a portion of an image is treated with the pressure-sensitive sheet of Example Q, in a manner such that the photosensitive surface of the sheet will confront the waxy composition layer formed on the original. Then, the assembly is exposed to light and heat from a mercury lamp. Thus, a latent image of the diazonium salt is formed on the photosensitive sheet, and by the heat transfer of the dyestuff, the sheet is colored in blue in the portion corresponding to the image portion treated with the treating material of Example Q. Then, the sheet is developed with a mixed gas of ammonia and steam. As a result, the latent image portion is colored in red and a two-color copy is obtained.

Example 6

An image is formed on a semi-transparent tracing paper with use of the pressure-sensitive sheet of Example O, and the tracing paper is disposed between an original and the photosensitive sheet prepared in Example 4, in a manner such that the photosensitive layer of the photosensitive sheet will confront the waxy composition layer applied to the tracing paper. Thus, light of a mercury lamp is irradiated on the assembly from above the original, and the assembly is heated. Thus, the dyestuff on the intermediate tracing paper is transferred to the photosensitive sheet to form an image thereon. Then, the sheet is developed with a mixed gas of ammonia and steam. As a result, the latent image is colored in bluish violet and a two-color reproductive copy is obtained.

Example 7.—Multicolor-forming photosensitive paper for either wet or dry development A solution of the following recipe is prepared:

| | G. |
|---|---|
| 4-Diazo-2,5-dibutoxy-N-phenyl morpholine·½$ZnCl_2$ | 15 |
| Citric acid | 30 |
| Diethylene glycol | 20 |
| β-Hydroxynaphthoic acid aminoethyl amine (hydrochloride) | 10 |
| Thiourea | 40 |
| Zinc chloride | 30 |
| Patent Blue | 0.1 |
| Water | Balance |

Total: 1 liter.

In the same manner as in Example 1, a photosensitive paper is prepared from the above solution by coating and drying. The photosensitive sheet is placed on an original, a part of a pattern of which is treated with the treating agent of Example C on the back surface thereof. The assembly is heat treated, and then exposed to light emitted from a flourescent lamp to form a latent image of the diazonium salt and to color in reddish brown the portion of the sheet corresponding to the treated portion of the original by the heat transfer of the dyestuff. Then, the sheet is developed with a gaseous mixture of ammonia and steam or a liquid developer of the following recipe:

| | G. |
|---|---|
| Potassium carbonate | 30 |
| Sodium thiosulfate | 40 |
| Sodium bicarbonate | 30 |
| Potassium tetraborate | 5 |
| Activating agent | 0.5 |
| Water | Balance |

Total: 1 liter.

As a result, the latent image portion is colored in blue and a two-color copy is obtained.

Example 8.—Multicolor-forming photosensitive film

A solution of the following recipe is prepared:

| | | |
|---|---|---|
| 4-Diazo-2,5-dibutoxy-N-phenyl morpholine·½$ZnCl_2$ | g. | 10 |
| Citric acid | g. | 8 |
| β-Hydroxynaphthoic acid ethanol amine | g. | 8 |
| Triacetate resin | g. | 15 |
| Oil Blue | g. | 0.2 |
| Acetone | ml. | 700 |
| Methanol | ml. | 300 |

The solution is coated on a polyester film by a rod coater and dried at a relatively low temperature (40–50° C.) by warm air to form a photosensitive film. The film is placed on an original in which a part of the back surface of an original image is treated with the ink-like composition of Example A and another part of the back surface of the image is treated with the ink-like composition of Example G. The assembly is exposed to light and heat emitted from a mercury lamp. Thus, the photoresolution of the diazonium salt forms a latent image on the film, and at the same time, by the heat transfer of the dyestuffs, the film is colored in yellow in the portion corresponding to the portion of the original treated with the composition of Example A and in orange in the portion corresponding to the portion of the original treated with the composition of Example G. When the film is developed with a mixed gas of ammonia and steam, the latent image portion is colored in blue and a three-color reproductive copy is obtained.

Example 9.—Multicolor-forming photosensitive paper

A solution of the following recipe is prepared:

| | G. |
|---|---|
| 4-Diazo-N,N-dimethylaniline chloride·½$ZnCl_2$ | 10 |
| Diethylene glycol | 40 |
| Citric acid | 30 |
| 2,2-Dihydroxynaphthalene-6-sulfonic acid | 8 |
| Zinc chloride | 50 |
| Thiourea | 50 |
| Patent Blue | 0.1 |
| Water | Balance |

Total: 1 liter.

The solution is coated on a base paper by means of an air knife coater and dried to form a photosensitive sheet.

An original for multicolor reproduction is prepared by drawing letters and patterns on a transparent or semitransparent sheet original with the orange color-forming ink-like composition of Example G and the pink color-forming ink-like composition of Example H and treating a portion of the back surface of the original with the red color-forming ink-like composition of Example T and another portion of the back surface of the original with the yellow color-forming waxy composition of Example U.

The so formed original for multicolor reproduction is placed on the above photosensitive sheet in a manner such that the photosensitive layer of the photosensitive sheet will confront the back surface of the original. Then, the assembly is exposed to light emitted from a mercury lamp and heated by an infrared lamp. By the light exposure the diazonium salt of the photosensitive sheet is decomposed except in portions which have been covered by the images and have not been exposed to light and in which a latent image is formed. By the irradiation by the infrared lamp, orange and pink letters and patterns are transferred on portions of the photosensitive paper corresponding to the portions of the original treated with the ink-like compositions of Examples G and H, and the couplers contained in the compositions of Examples T and U, namely the pyrazolone and acetoacetic acid anilide, are also transferred on portions of the photosensitive sheet corresponding to the portions of the original treated with the compositions of Examples T and U.

Then, the photosensitive sheet is developed with an ammonia gas containing steam, and a 5-color copy which has a basic blue color on which orange, pink, red and yellow figures and patterns are formed is obtained.

What we claim is:

1. A process for diazo-type multi-color reproduction, which comprises (A) exposing a diazo-type photosensitive material image-wise to actinic light by exposing through an original sheet of an assembly of (i) an original sheet having opaque image areas and transparent or semi-transparent non-image areas on one surface, and a layer (α) containing a thermovolatile or sublimable dyestuff or pigment (*d*) selected from the group consisting of Oil Red TR (Color Index 21260), Oil Red RC (Color Index 26105), Oil Orange S (Color Index 12055), Oil Brown SG (Color Index 12020), Oil Brown PB (Color Index 12020), Oil Yellow 3G (Color Index 12700), Super Pink (Color Index 45170), Super Green (Color Index 42000), Super Yellow (Color Index 41000), Celliton Blue GR (Color Index 64500), Celliton Blue TFB (Color Index 62035) and Celliton Scarlet B (Color Index 11110) and a layer (β) containing at least one thermovolatile or sublimable azo coupling component ($a$), said layers ($\alpha$) and ($\beta$) being on the opposite surface of said original sheet, said layer ($\alpha$) being located in only preselected areas which are contiguous with transparent or semi-transparent non-image areas of said original sheet, and layer ($\beta$) being located in only preselected areas which are contiguous with opaque image areas of said original sheet, said preselected areas being present in only a portion of the areas contiguous with said image or non-image areas of said original sheet, and (ii) a diazo-type photosensitive material having a photosensitive layer containing at least one photosensitive diazonium salt ($c$), an acidic stabilizer and an azo coupling component ($b$) having a substantially lower rate of coupling with the diazonium salt ($c$) under the developing conditions than that of the azo coupling component ($a$) said original sheet (i) being superposed on said diazo-type photosensitive material (ii) so that the layers ($\alpha$) and ($\beta$) come into face-to-face contact with the photosensitive layer;

(B) heating said assembly to thereby heat-transfer said layers ($\alpha$) and ($\beta$) to the corresponding position on the surface of said photosensitive layer and to form thereon a colored image area as a result of the transfer of the dyestuff or pigment ($d$) and a latent image area to which the azo coupling component ($a$) has been transferred, said steps (A) and (B) being performed simultaneously or in the same sequence of (A) to (B) or (B) to (A); and (C) contacting the exposed photosensitive material with a mixture of ammonia and steam or an alkali-containing aqueous liquid developer to thereby develop said photosensitive material, whereby in the unexposed latent image area of the portion to which the azo coupling component ($a$) has been heat-transferred, an azo dye ($c$)–($a$) having a certain hue or color is formed by the selective reaction of the heat-transferred azo coupling component ($a$) with the diazonium salt ($c$), and at the same time, in the unexposed latent image areas to which the azo coupling component ($a$) has not been heat-transferred, an azo dye ($c$)–($b$) having a different hue or color from said dye ($c$)–($a$) is formed by the reaction of the azo coupling component ($b$) with the diazonium salt ($c$), the hue or color of each of the azo dyes ($c$)–($a$) and ($c$)–($b$) being different from that of the dyestuff or pigment ($d$) transferred, thus producing a multi-colored copied image.

2. The process of claim 1 wherein said dyestuff or pigment ($d$) is applied in the form dissolved or dispersed in a liquid or semi-solid dispersion medium.

3. The process of claim 1 wherein said azo coupling component ($a$) is a compound free of a sulphonic acid group and selected from a phenol compound, a hydroxynaphthalene compound, an aniline compound and a compound containing an active methylene group.

4. The process of claim 1 wherein said azo coupling component ($a$) is applied in the form dissolved or dispersed in a liquid or semi-solid dispersion medium.

5. The process of claim 1 wherein the volatilizing or sublimating point of said azo coupling component (a) approximates the volatilizing or sublimating point of said dyestuff or pigment ($d$).

6. A process for diazo-type multi-color reproduction which comprises (A) exposing a diazo-type photosensitive material image-wise to actinic light by exposing through an original sheet of an assembly of (i) an original sheet having opaque image areas and transparent or semi-transparent non-image areas on one surface, and a layer ($\alpha$) containing a thermovolatile or sublimable dyestuff or pigment ($d$) selected from the group consisting of Oil Red TR (Color Index 21260), Oil Red RC (Color Index 26105), Oil Orange S (Color Index 12055), Oil Brown SG (Color Index 12020), Oil Brown PB (Color Index 12020), Oil Yellow 3G (Color Index 12700), Super Pink (Color Index 45170), Super Green (Color Index 42000), Super Yellow (Color Index 41000), Celliton Blue GR (Color Index 64500), Celliton Blue TFB (Color Index 62035) and Celliton Scarlet B (Color Index 11110) and a layer ($\beta$) containing at least one thermovolatile or sublimable azo coupling component ($a$), said layers ($\alpha$) and ($\beta$) being on the opposite surface of said original sheet, said layer ($\alpha$) being located in only preselected areas which are contiguous with transparent or semi-transparent non-image areas of said original sheet, and layer ($\beta$) being located in only preselected areas which are contiguous with opaque image areas of said original sheet, said preselected areas being present in only a portion of the areas contiguous with said image or non-image areas of said original sheet, and (ii) a diazotype photosensitive material having a photosensitive layer containing at least one photosensitive diazonium salt ($c$), said original sheet (i) being superposed on said diazo-type photosensitive material (ii) so that the layers ($\alpha$) and ($\beta$) come into face-to-face contact with the photosensitive layer;

(B) heating said assembly to thereby heat-transfer said layers ($\alpha$) and ($\beta$) to the corresponding position on the surface of said photosensitive layer and to form thereon a colored image area as a result of the transfer of the dyestuff or pigment ($d$) and a latent image area to which the azo coupling component ($a$) has been transferred, said steps (A) and (B) being performed simultaneously or in the time sequence of (A) to (B) or (B) to (A); and (C) thereafter developing the exposed photosensitive layer with an alkaline aqueous liquid developer containing an azo coupling component ($b$), wherein said azo coupling component ($a$) has a higher coupling rate under developing conditions than said azo coupling component ($b$), whereby in the unexposed latent image area of the portion to which the azo coupling component (a) has been heat-transferred, an azo dye ($c$)–($a$) having a certain hue or color is formed by the selective reaction of the heat-transferred azo coupling component ($a$) with the diazonium salt ($c$) and at the same time, in the unexposed latent image areas to which the azo coupling component ($\alpha$) has not been heat-transferred, an azo dye ($c$)–($b$) having a different hue or color from said azo dye ($c$)–($a$) is formed by the reaction of the azo coupling component ($b$) with the diazonium salt ($c$), the hue or color of each of the azo dyes ($c$)–($a$) and ($c$)–($b$) being different from that of the pigment or dyestuff ($d$) transferred, thus producing a multi-colored copied image.

7. The process of claim 6 wherein said dyestuff or pigment ($d$) is applied in the form dissolved or dispersed in a liquid or semi-solid dispersion medium.

8. The process of claim 6 wherein said azo coupling component ($a$) is a compound free of a sulphonic acid group and selected from a phenol compound, a hydroxynaphthalene compound, an aniline compound and a compound containing an active methylene group.

9. The process of claim 6 wherein said azo coupling component ($a$) is applied in the form dissolved or dispersed in a liquid or semi-solid dispersion medium.

10. The process of claim 6 wherein the volatilizing or sublimating point of said azo coupling component ($a$) approximates the volatilizing or sublimating point of said dyestuff or pigment ($d$).

(References on following page)

References Cited

UNITED STATES PATENTS

| | | | |
|---|---|---|---|
| 3,653,903 | 4/1972 | Nihyakumen et al. | 96—49 |
| 3,454,764 | 7/1969 | Collier et al. | 96—49 X |
| 3,280,735 | 10/1966 | Clark et al. | 250—65 T |
| 2,789,904 | 4/1957 | Benbrook et al. | 96—49 |
| 2,542,716 | 2/1951 | Slifkin | 96—49 X |
| 3,715,213 | 2/1973 | Nihyakumen et al. | 96—49 |

FOREIGN PATENTS

| | | | |
|---|---|---|---|
| 686,686 | 1/1953 | Great Britain | 96—91 R |
| 1,000,151 | 8/1965 | Great Britain | 96—49 |
| 694,580 | 7/1953 | Great Britain | 96—49 |
| 2,007,690 | 10/1970 | West Germany | 96—49 |

OTHER REFERENCES

Kosar, J., "Light-Sensitive Systems," Wiley & Sons, 1965, p. 306.

CHARLES L. BOWERS, Jr., Primary Examiner

U.S. Cl. X.R.

96—91 R; 117—36.8, 36.9; 250—317